US012811508B2

(12) United States Patent
Jin et al.

(10) Patent No.: US 12,811,508 B2
(45) Date of Patent: Nov. 24, 2026

(54) ELECTRONIC RECTIFIER CIRCUIT FOR ADAPTIVE GATE VOLTAGE REGULATION OF A SYNCHRONOUS RECTIFIER FIELD-EFFECT TRANSISTOR

(71) Applicants: NEXPERIA B.V, Nijmegen (NL); Nexperia Technology (Shanghai) Ltd., Shanghai (CN)

(72) Inventors: GaoXian Jin, Shanghai (CN); Minhua Wang, Shanghai (CN); Minyi Xie, Shenzhen (CN); Feifei Shen, Shenzhen (CN); Wanhua Zeng, Shenzhen (CN); Long Huang, Shenzhen (CN)

(73) Assignees: Nexperia B.V., Nijmegen (NL); Nexperia Technology (Shanghai) Ltd., Shanghai (CN)

( * ) Notice: Subject to any disclaimer, the term of this patent is extended or adjusted under 35 U.S.C. 154(b) by 165 days.

(21) Appl. No.: 18/800,352

(22) Filed: Aug. 12, 2024

(65) Prior Publication Data

US 2025/0055381 A1 Feb. 13, 2025

(30) Foreign Application Priority Data

Aug. 11, 2023 (EP) .................................... 23191061

(51) Int. Cl.
*H02M 3/335* (2006.01)

(52) U.S. Cl.
CPC .... *H02M 3/33592* (2013.01); *H02M 3/33507* (2013.01)

(58) Field of Classification Search
CPC ......... H02M 3/33538; H02M 3/33546; H02M 3/33515; H02M 3/33576; H02M 3/33553; H02M 3/33507; H02M 3/33592; H02M 3/33523; H02M 3/3353; H02M 3/33569
See application file for complete search history.

(56) References Cited

U.S. PATENT DOCUMENTS

2015/0124495 A1* 5/2015 Kong ................ H02M 3/33592 363/21.14
2023/0010393 A1 1/2023 Zhao

FOREIGN PATENT DOCUMENTS

CN 114765420 A 7/2022

OTHER PUBLICATIONS

Extended European Search Report for corresponding application EP23191061.3, 8 pages, dated Feb. 16, 2024.

* cited by examiner

*Primary Examiner* — Bryan R Perez
(74) *Attorney, Agent, or Firm* — Ruggiero McAllister & McMahon LLC

(57) ABSTRACT

An electronic rectifier circuit for adaptive gate voltage regulation of a synchronous rectifier field-effect transistor is provided, the electronic rectifier circuit is configured to clamp a drain-source voltage of the SR FET to a first regulation voltage while the SR FET is switched on for less than a threshold time in a current switching cycle, and the electronic rectifier circuit is configured to clamp the Vds of the SR FET to a second regulation voltage while the SR FET is switched on for more than the threshold time in the current switching cycle, the threshold time is configured as a portion of time that the SR FET was switched on in one or more previous switching cycles, and Vreg2 is smaller than Vreg1.

14 Claims, 8 Drawing Sheets

400

ELECTRONIC RECTIFIER CIRCUIT FOR ADAPTIVE GATE VOLTAGE REGULATION OF A SYNCHRONOUS RECTIFIER FIELD-EFFECT TRANSISTOR

CROSS-REFERENCE TO RELATED APPLICATIONS

This application claims the benefit under 35 U.S.C. § 119 (a) of European Patent Application No. 23191061.3 filed Aug. 11, 2023, the contents of which are incorporated by reference herein in their entirety.

BACKGROUND

1. Field of the Disclosure

The present disclosure relates to an electronic rectifier circuit for adaptive gate voltage (Vg) regulation of a synchronous rectifier field-effect transistor (SR FET), a fast-charging power supply including such electronic rectifier circuit, and a method of adaptive Vg regulation of an SR FET.

2. Description of the Related Art

In power electronics, rectifiers may be used to convert alternating current (AC) to direct current (DC). Synchronous rectification is a technique used to improve the efficiency of rectifiers. In a SR circuit, power MOSFETs (Metal-Oxide-Semiconductor Field-Effect Transistors), or FETs in short, may be used as switches to replace traditional diodes. SR FETs may be controlled, typically on a secondary side of a transformer, by a gate signal synchronized with an input AC waveform, e.g., a drain-source voltage (Vds). In an example, when the input AC voltage is negative, the SR FET turns on, allowing current to flow through. When the AC voltage becomes positive, the SR FET turns off, preventing reverse current flow. By using SR FETs, the voltage drop across the rectifier may be significantly reduced compared to diodes, resulting in improved efficiency.

A primary-side (Pri) FET may be used as a switch in series with the primary winding of the transformer. When the Pri FET is turned on, it allows current to flow through the transformer, and when it is turned off, the current is interrupted.

Continuous conduction mode (CCM) is a mode of operation for switching power converters. CCM is commonly used in DC-DC converters such as buck, boost, and buck-boost converters. In CCM, an inductor in the converter typically remains in continuous conduction throughout the entire switching cycle. Discontinuous conduction mode (DCM) is another mode of operation for switching power converters. Similar to CCM, DCM is commonly used in DC-DC converters such as buck, boost, and buck-boost converters. In DCM, an inductor current typically drops to zero during a portion of the switching cycle.

CCM flyback is a mode of operation for a flyback converter, which is a type of isolated DC-DC converter. In CCM flyback operation, the primary magnetizing current of the transformer remains continuous throughout the entire switching cycle. The flyback converter typically includes a transformer, a power switch (usually a MOSFET), a diode, an input capacitor, and an output capacitor. It operates by storing energy in the transformer during the on-time of the power switch and releasing it to the output during the off-time. In CCM flyback operation, the power switch may be turned on, and energy from the input source may be stored in the primary winding of the transformer, creating a magnetic field. Energy transfer takes place when the power switch is turned off. The stored energy in the magnetic field induces a voltage across the secondary winding of the transformer, which is rectified by the diode and transferred to the output capacitor and load. CCM flyback converters are commonly used in various applications, including low-power offline power supplies, LED drivers, battery chargers, and isolated power supplies.

FIG. 1 shows a high-power fast-charging power supply 100 with flyback circuit architecture including a transformer 102, a Pri FET 104, an SR FET 106 and a driver circuit 108. For each of the FETs 104, 106 the gate (G), source(S) and drain (D) are identified. At the SR FET 106, the D-S current (Ids) and the Vg are indicated as well. Such fast-charging power supply may operate in CCM under heavy load. A traditional SR controller may detect a zero-crossing Vds of the SR FET when the Pri FET turns on, which forces the SR FET to turn off. Because of voltage sampling delay and driving voltage drop delay, the SR FET may not be turned off in time. The Pri FET and SR FET may then be conducted at the same time, which can result in large crossover loss, low efficiency, high stress of switch and damaged devices.

SR controllers are known that adopt a fixed Vg regulation mode with one step gate regulation. In this mode, when the Vds voltage reaches the clamping value, the Vg amplitude may be decreased to regulate the Vds voltage at the clamping value, thus to speed up the turn off speed of the SR FET. However, a one step regulation circuit significantly relies on the selection of the drain-source on-resistance (Rdson) of the MOSFET, and the Vg is difficult to regulate under deep CCM because the Vds voltage is too low to trigger the Vds clamping level before the Pri FET turn on signal arrives. This may result in Vg adjustment failure or inadequate adjustment, so fast shutdown cannot be achieved.

FIG. 2 shows a graph 200 of currents, voltages and time delays. Lines are shown for SR current 202, SR voltage 204 and Vg. In the Y-axis direction, voltage levels are indicated for a gate voltage threshold (Vg_th) and a clamping level at a first regulation voltage (Vreg1). The X-axis represents time. In the X-axis direction, the turn on delay 210 and the turn off delay 212 are indicated. Vds may be clamped in a fixed level and Vg may be regulated under light CCM condition. In such scenario, if the clamping level is high and when a high Rdson FET is used, it may be difficult or even impossible to regulate the Vg of the switch low enough before the SR FET is turned off, which may result in a long turn off delay when the switch off signal arrives and high switching stress. If the clamping level is low and when a low Rdson FET is used, the turn off delay time 212 may be relatively short because the Vg is deeply regulated, but conduction loss may be much higher and may result in low efficiency.

During deep CCM or when a high Rdson FET is used, it may be difficult or even impossible to regulate the Vg, resulting in a relatively long turn off delay time. FIG. 3 shows a graph 300 of currents, voltages and time delays for such scenario. Lines are shown for SR current 302, SR voltage 304 and Vg. In the Y-axis direction, voltage levels are indicated for a Vg_th and Vreg1. The X-axis represents time. In the X-axis direction, the time on delay 310 and the time off delay 312 are indicated.

In the above CCM flyback gate regulation scenarios it is difficult or even impossible to achieve high efficiency and low switching stress at the same time. On the other hand, with, e.g., the release of quick charger protocol "power delivery (PD) 3.1", quick chargers and adapters used for smart phones, tablets, laptops, power tools and other fast charging devices have increasingly high-power requirements, and the power density of products is also increasingly high. Such quick charger power supply is required to have higher efficiency. With a traditional diode rectifier, it is difficult or impossible to meet the requirements of high current and high-power density while the application of SR is becoming increasingly popular.

SUMMARY

A summary of aspects of certain examples disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects and/or a combination of aspects that may not be set forth.

The present disclosure aims to overcome the drawbacks identified in the background section. In particular, the present disclosure aims to achieve a turn off delay time with adaptive Vg regulation, wherein the turn off delay time is much shorter compared to current solutions. Advantageously, this may result in a switch device, such as an SR FET, having less stress, less cross conduction loss and better reliability.

According to an aspect of the present disclosure, an electronic rectifier circuit for adaptive Vg regulation of an SR FET is presented. The electronic rectifier circuit may be configured to clamp a Vds of the SR FET to a Vreg1 while the SR FET is switched on for less than a threshold time in a current switching cycle. The electronic rectifier circuit may be configured to clamp the Vds of the SR FET to a second regulation voltage (Vreg2) while the SR FET is switched on for more than the threshold time in the current switching cycle. The threshold time may be configured as a portion of time that the SR FET was switched on in one or more previous switching cycles. Vreg2 may be smaller than Vreg1.

In an embodiment, the electronic rectifier circuit may include a first Vg detection part configured to measure an amount of time that the SR FET is switched on. The first Vg detection part may further be configured to store a first signal representative of said amount of time in a sample holder. The electronic rectifier circuit may further include a second Vg detection part configured to measure a further amount of time that the SR FET is switched on to obtain a second signal. The electronic rectifier circuit may further include a comparator having as inputs the first signal obtained from the sample holder and the second signal. The comparator may have as output a selection signal. The electronic rectifier circuit may further include a multiplexer configured to output Vreg1 or Vreg2 depending on the selection signal.

In an embodiment, the first Vg detection part may include a first capacitor. The second Vg detection part may include a second capacitor. The first capacitor and the second capacitor may be dimensioned in a ratio defining the threshold time.

In an embodiment, the second capacitor may be dimensioned at 90% of the value of the first capacitor.

According to an aspect of the present disclosure, a fast-charging power supply is presented. The fast-charging power supply may include a transformer. The fast-charging power supply may further include a primary side field-effect transistor (Pri FET). The fast-charging power supply may further include an SR FET. The fast-charging power supply may further include an electronic rectifier circuit having one or more of the above identified features.

According to an aspect of the present disclosure, a method of adaptive Vg regulation of an SR FET is presented. The method may include turning on the SR FET by setting Vg of the SR FET to high. The method may further include starting a timer for counting an on-time of the SR FET in a current switching cycle. The method may further include determining whether the on-time of the SR FET exceeds a portion of a previous on-time of the SR FET in one or more previous switching cycles. The method may further include clamping Vds to a Vreg1, if the on-time does not exceed a portion of the previous on-time. The method may further include clamping Vds to a Vreg2, if the on-time exceeds a portion of the previous on-time.

In an embodiment, the method may further include turning on the SR FET after detecting that a Vds of the SR FET is below a turn on threshold value (Von_th).

In an embodiment, the method may further include, after clamping the Vds to the Vreg2, determining if the Vds of the SR FET exceeds a turn off threshold value (Voff_th). The method may further include, if the Vds of the SR FET exceeds the Voff_th, turning off the SR FET by setting the Vg to low.

In an embodiment, the method may further include, after the SR FET has been turned off, storing the on-time of the SR FET obtained by the timer for use as the previous on-time in a next switching cycle. The timer may be stopped before storing the on-time.

BRIEF DESCRIPTION OF DRAWINGS

Embodiments of the present disclosure will now be described, by way of example only, with reference to the accompanying schematic drawings in which corresponding reference symbol indicate corresponding parts, in which.

The figures are intended for illustrative purposes only, and do not serve as restriction of the scope of the protection as laid down by the claims.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure but is merely representative of various embodiments. While the various aspects of the embodiments are presented in drawings, the drawings are not necessarily drawn to scale unless specifically indicated.

The described embodiments are to be considered in all respects only as illustrative and not restrictive. The scope of the present disclosure is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present disclosure should be or are in any single example of the present disclosure. Rather, language referring to the features and advantages is understood to mean that a specific feature, advantage, or characteristic described in connection with an embodiment is included in at least one embodiment of the present disclosure. Thus, discussions of the features and advantages, and similar language, throughout this specification may, but do not necessarily, refer to the same example.

Furthermore, the described features, advantages, and characteristics of the present disclosure may be combined in any suitable manner in one or more embodiments. One skilled in the relevant art will recognize, in light of the description herein, that the present disclosure can be practiced without one or more of the specific features or advantages of a particular embodiment. In other instances, additional features and advantages may be recognized in certain embodiments that may not be present in all embodiments of the present disclosure. Reference throughout this specification to "one embodiment," "an embodiment," or similar language means that a particular feature, structure, or characteristic described in connection with the indicated embodiment is included in at least one embodiment of the present disclosure. Thus, the phrases "in one embodiment," "in an embodiment," and similar language throughout this specification may, but do not necessarily, all refer to the same embodiment.

Figure 1:
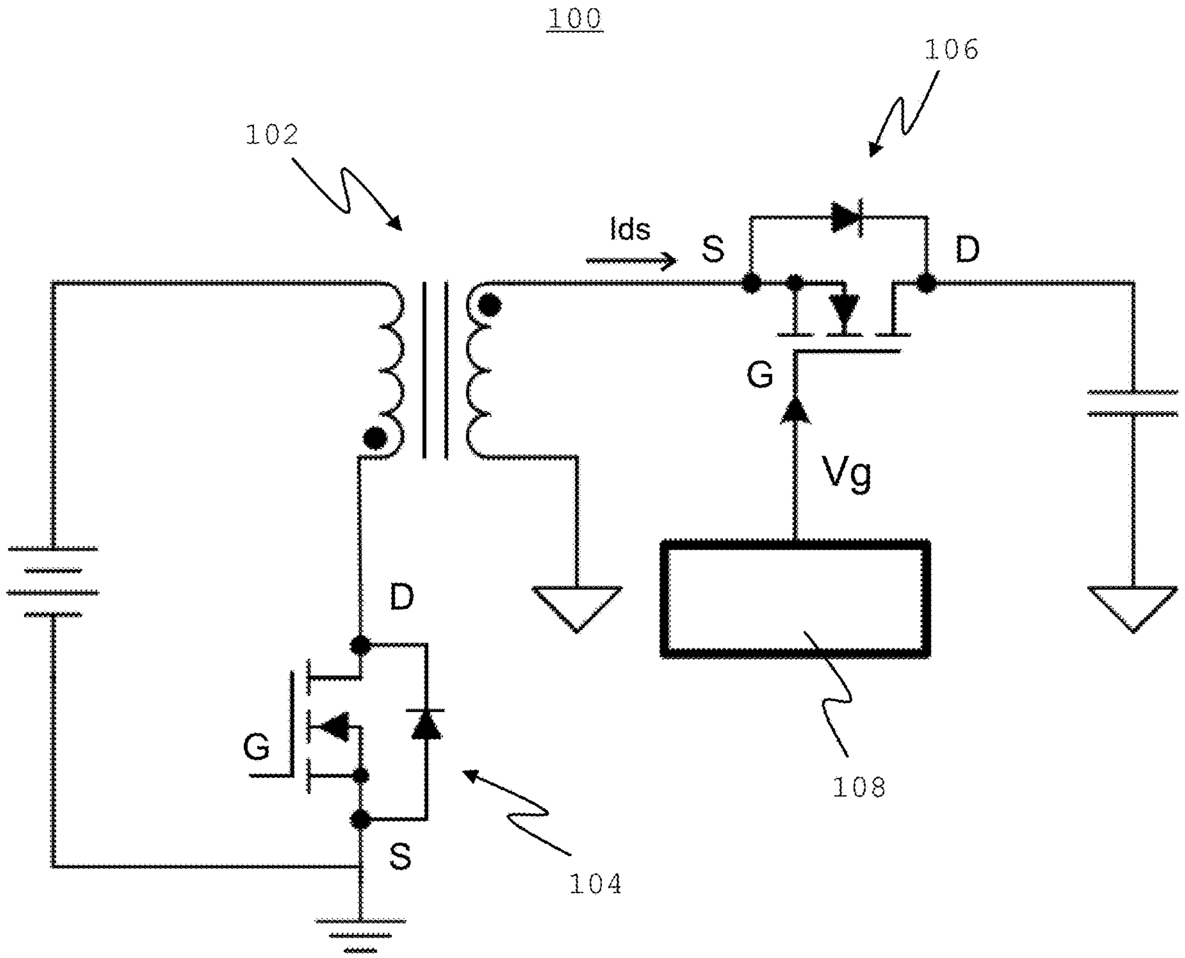
FIG. 1 shows a high-power fast-charging power supply with flyback circuit architecture.
Figure 2:
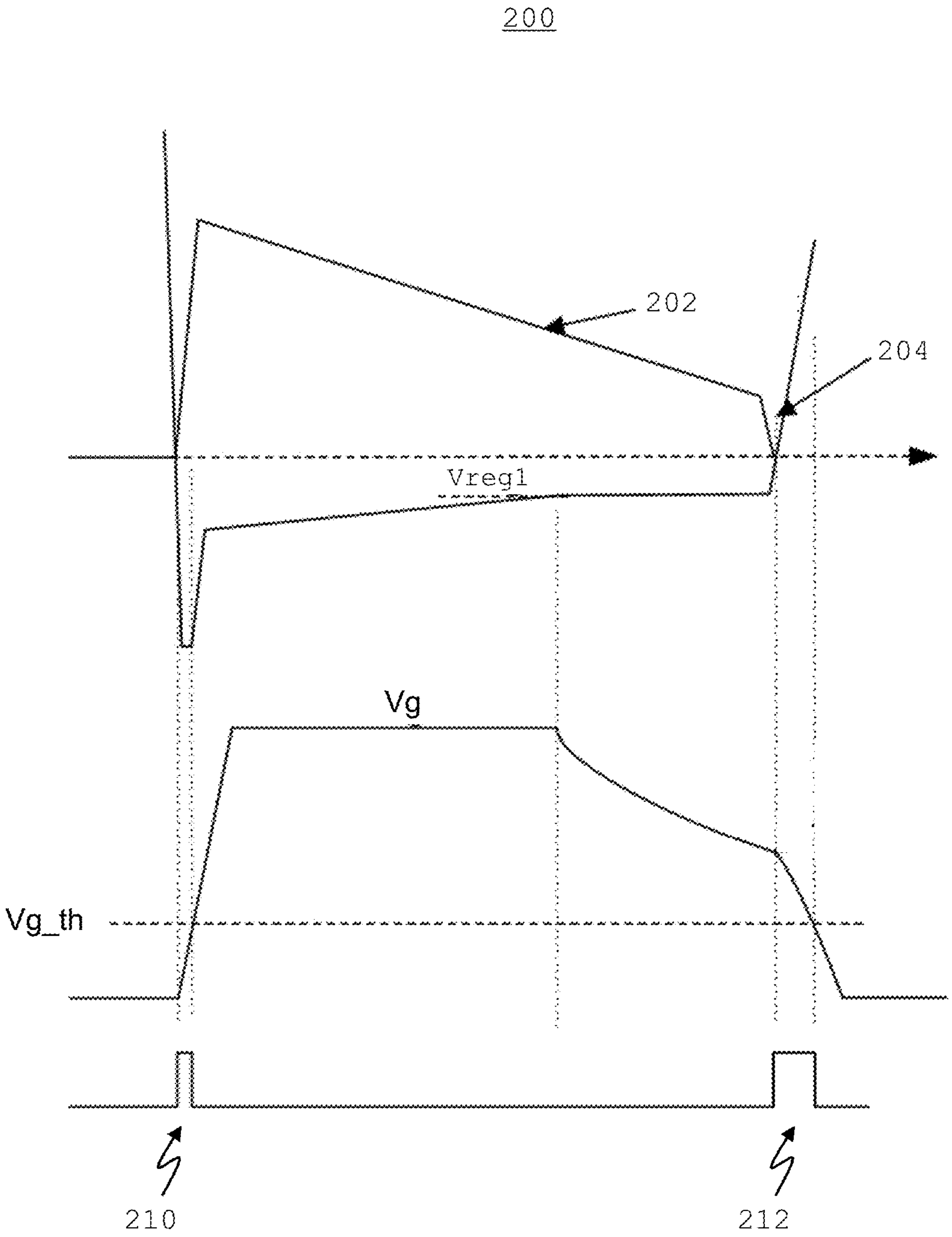
FIG. 2 shows a graph of currents, voltages and time delays of a prior art fast-charging power supply during light CCM.
Figure 3:
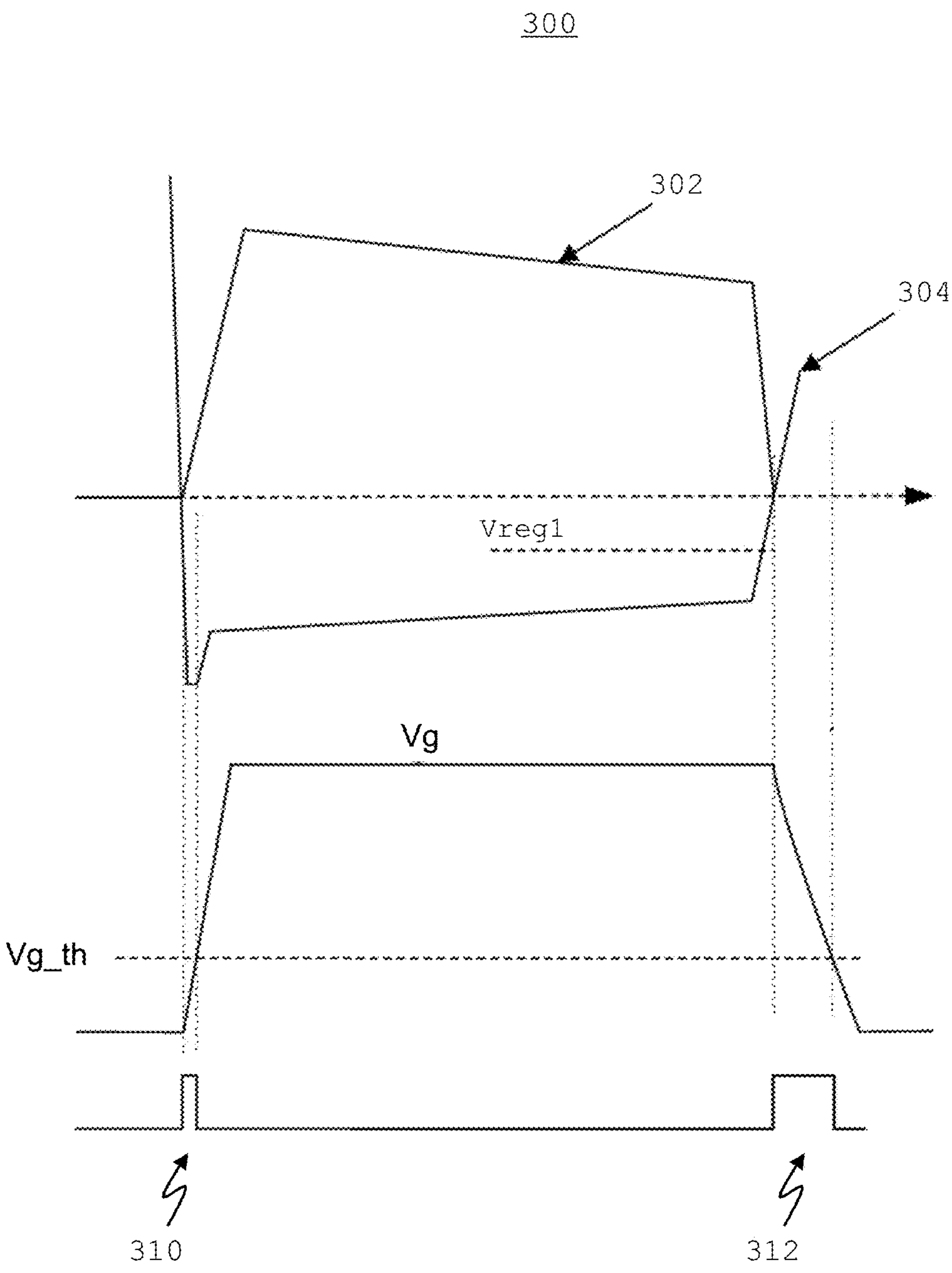
FIG. 3 shows a graph of currents, voltages and time delays of a prior art fast-charging power supply during deep CCM or when a high Rdson FET is used.
Figure 4:
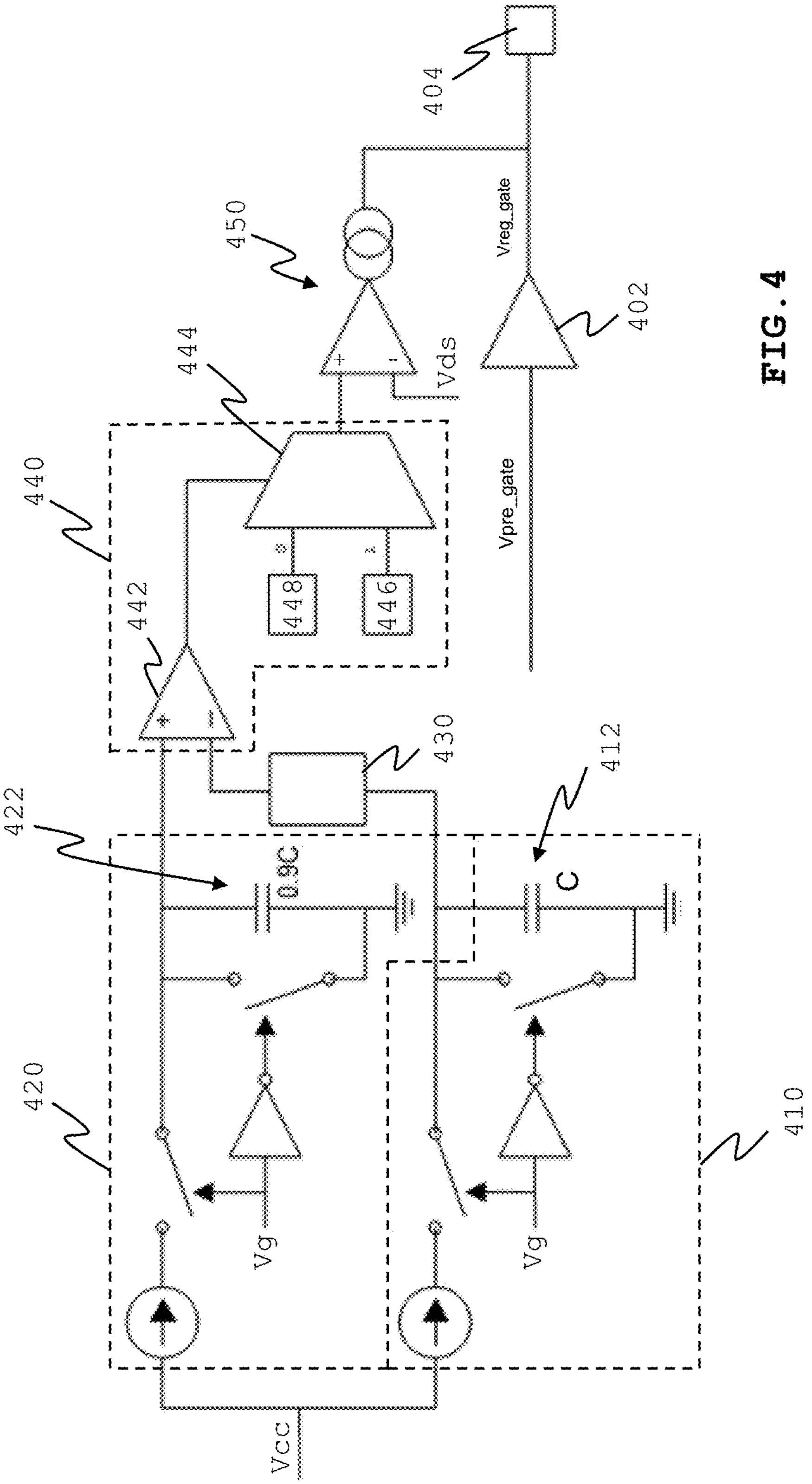
FIG. 4 shows an electronic rectifier circuit for adaptive gate Vg regulation of a SR FET, according to an example embodiment of the present disclosure.

FIG. 4 shows a circuit block diagram of a circuit 400 for adaptive Vg regulation according to an example embodiment. The circuit 400 may replace the driver circuit 108 of FIG. 1. Circuit 400 enables a pre-regulation gate voltage (Vpre_gate) of a gate 402 to be adaptively regulated to a regulated gate voltage (Vreg_gate). The Vreg_gate may be provided to the SR FET, depicted by block 404.

The circuit 400 may include a first Vg detection part 410 for detecting and storing an on-time duration of the SR in one or more previous switching cycles. For example, a signal representative of the on-time duration of the SR of two previous switching cycles may be measured and stored in a sample holder 430. The circuit 400 may further include a second Vg detection part 420 for detecting an on-time duration of the SR in a current switching cycle.

A selector 440 may determine if the conduction time (i.e., on-time) of the SR FET in the current switching cycle is within a predefined portion of an on-time duration of the previous switching cycles. For example, if the on-time duration of the current switching cycle is to be within 90% of the on-time duration of the previous switching cycles, second capacitor 422 may be dimensioned at 90% of first capacitor 412, as depicted in the example of FIG. 4 for capacitors 422 and 412 as 0.9 C and C, respectively.

A comparator 442 may compare the on-time of the current switching cycle with the on-time of the previous switching cycles, which result may be output as a selection signal to a multiplexer 444 for selecting a Vreg2 446 or a Vreg1 448, depending on whether the conduction time of the SR FET in the current switching cycle is below or above the threshold time.

The selected regulation voltage level may then be provided to an operational transconductance amplifier (OTA) 450 for generating Vreg_gate. Thus, adaptive Vg regulation may be achieved by adapting Vreg_gate using Vreg2 and Vreg1.

For example, if the conduction time (i.e., on-time) of the SR FET in the current switching cycle is within a threshold time, e.g., 90% of the on-time duration of the two previous cycles, the selector 440 may selects a channel 0 of the multiplexer 444 for a regulation voltage of Vreg1 448. Until the threshold time, the regulation voltage of the OTA 450 is Vreg1 448, which may be input to the non-inverting input terminal of the OTA 450. Vds sampling voltage may be input to the inverting input terminal of the OTA 450, so to adjust the gate driver voltage Vg after amplification by the OTA 450. The lower the Vg, the higher the Rdson of the SR FET, which results in lower Vds voltage (the current flows from the source(S) pin to the drain (D) pin of the SR FET). If the Vds voltage is too low, the OTA 450 increases the Vg to increase the Vds voltage, so to keep it equal to the regulation voltage.

For example, if the conduction time (i.e., on-time) of the SR FET in the current switching cycle reaches the threshold time, e.g., of 90% of the on-time duration of the two previous cycles, the selector 440 may select a channel 1 of the multiplexer 444 for a regulation voltage of Vreg2 446. Vds may then be stabilized at Vreg2 by further reducing Vg. Vg may drop sharply and quickly reach the turn on threshold voltage of the SR FET when the Pri FET on signal arrives, so to quickly turn off the SR FET.

Figure 5:
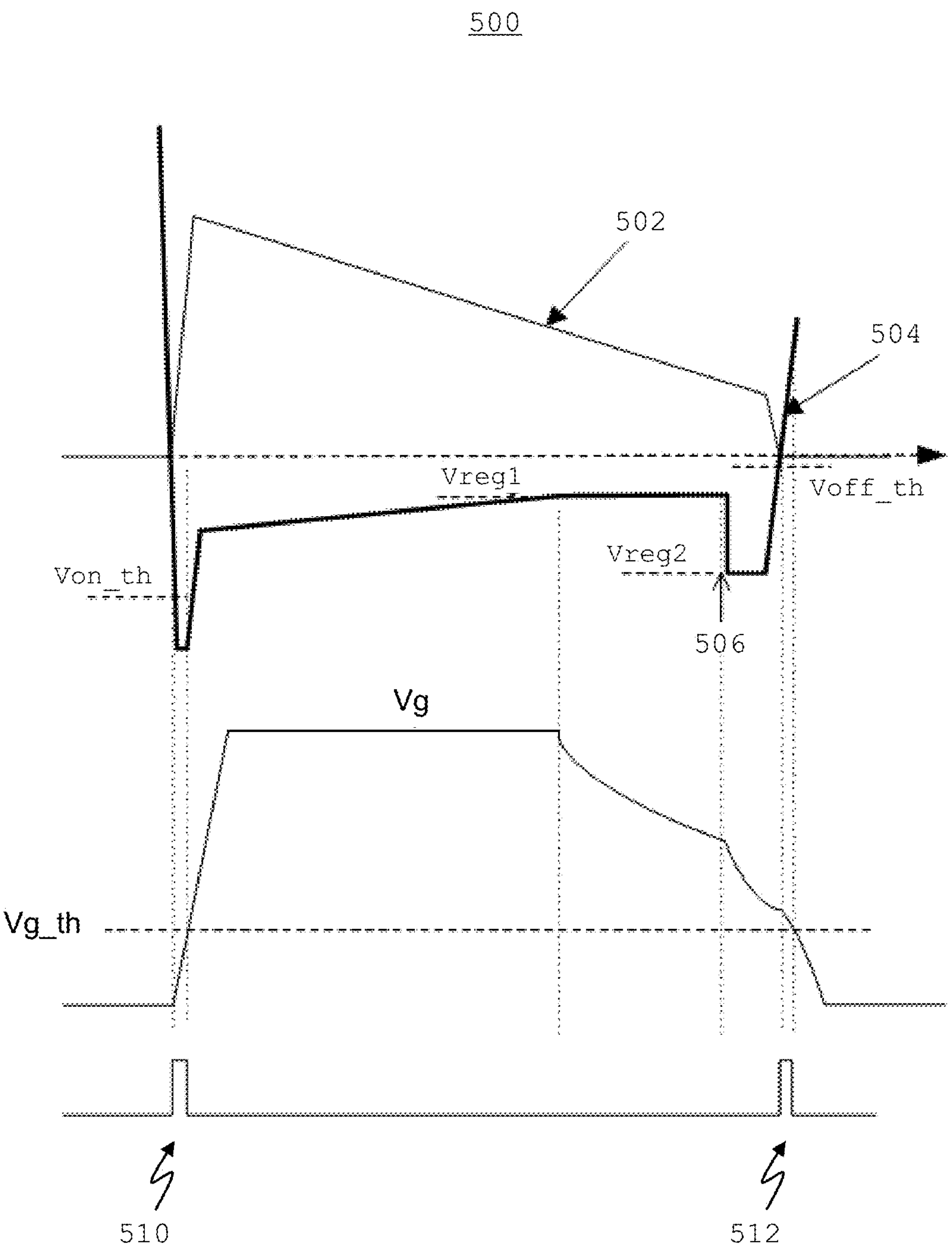
FIG. 5 shows a graph of currents, voltages and time delays of an electronic rectifier circuit for adaptive gate Vg regulation of a SR FET in a DCM or a light CCM mode, according to an example embodiment of the present disclosure.

FIG. 5 shows a first example graph 500 of currents, voltages and time delays for the circuit 400 in a DCM or a light CCM mode. Lines are shown for the SR current 502, the SR voltage 504 and Vg. In the Y-axis direction, voltage levels are indicated for a Vg_th, a Von_th, a Voff_th, Vreg2 and Vreg1. The X-axis represents time. In the X-axis direction, the time on delay 510, the time off delay 512 and 90% 506 of the on-time (Ton) are indicated.

In light CCM mode the inductor current in a converter typically remains in continuous conduction throughout most of the switching cycle, but for a short duration it may drop to zero or near zero. As can be seen in the graph 500, the Vds voltage (i.e., SR voltage 504) may be increased to the first regulation level Vreg1 and clamped to Vreg1 before 90% (506) of the last Ton cycle is reached. The gate driver voltage may be decreased when Vds voltage is regulated at Vreg1. The Vds voltage (i.e., SR voltage 504) may be pulled down from the Vref2 clamping level to the second regulation level Vreg2 and clamped to Vreg2 when 90% (506) of the on-time duration Ton is reached. Since Vreg2 is typically much lower than Vreg1, Vg may drop at a faster slope and close to the turn-off threshold of the SR FET. As a result, the SR FET may be quickly turned off within a short time 512 when the turn on signal of the Pri FET arrives.

Figure 6:
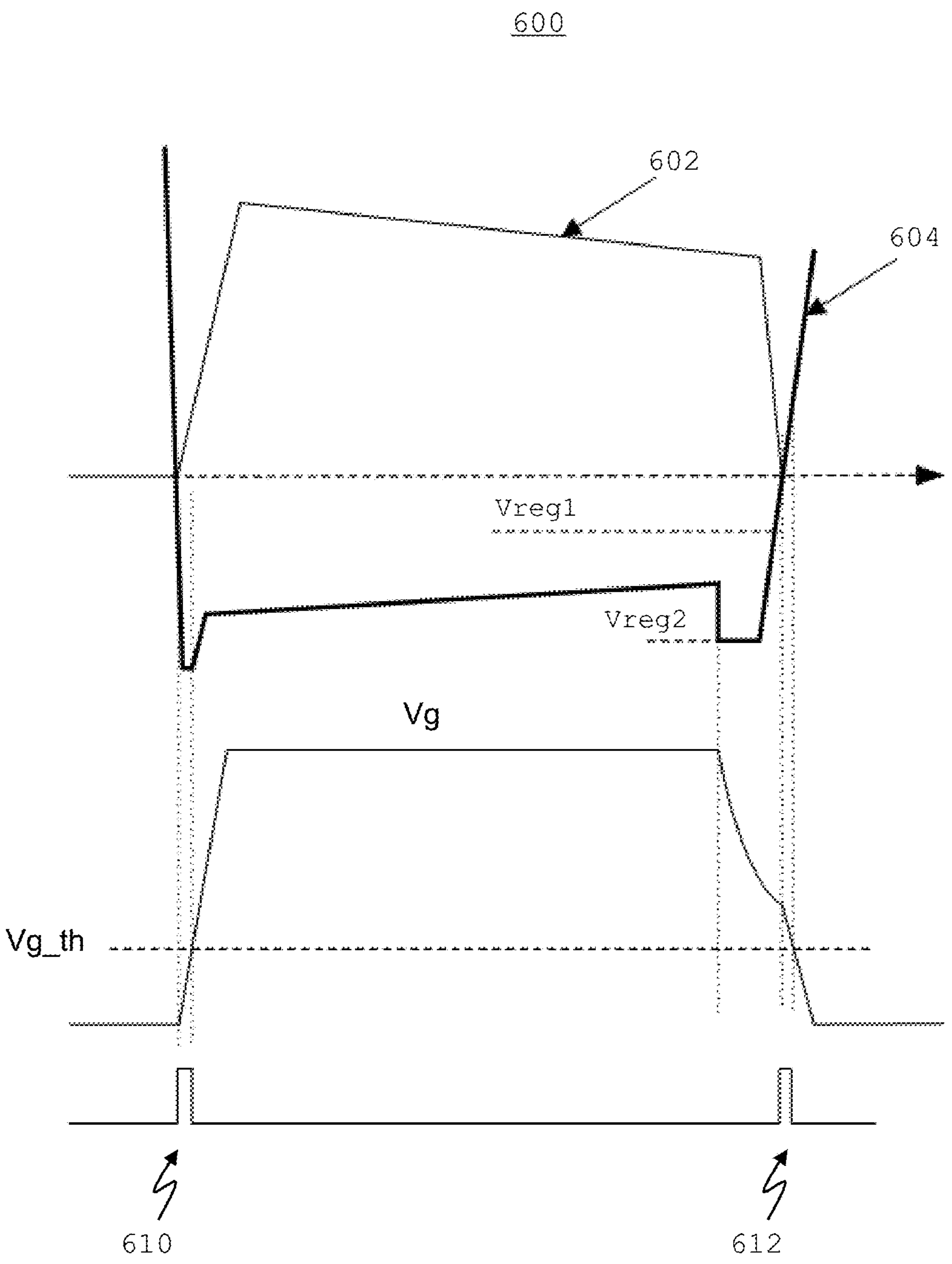
FIG. 6 shows a graph of currents, voltages and time delays of an electronic rectifier circuit for adaptive gate Vg regulation of a SR FET in a deep CCM mode, according to an example embodiment of the present disclosure.

FIG. 6 shows a second example graph 600 of currents, voltages and time delays for the circuit 400 in deep CCM mode. Lines are shown for the SR current 602, the SR voltage 604 and Vg. In the Y-axis direction, voltage levels are indicated for a Vg_th, Vreg2 and Vreg1. The X-axis represents time. In the X-axis direction, the time on delay 610 and the time off delay 612 are indicated.

In deep CCM mode the inductor current in a converter typically remains in continuous conduction for the whole cycle and the current change amplitude is typically relatively small compared to the peak current. As can be seen in the graph 600, the Vds voltage may not trigger the second clamping level at the first regulation voltage Vreg1. When the time reaches 90% of the on-time duration, the circuit may directly pull the clamping level to the first clamping level at the second regulation voltage Vreg2. At this moment, Vg may drop at a fast slope and close to the turn-off threshold of the SR FET. As a result, the SR FET may be quickly turned off within a short time, i.e., short Toff delay 612, when the turn on signal of the Pri FET arrives.

Figure 7:
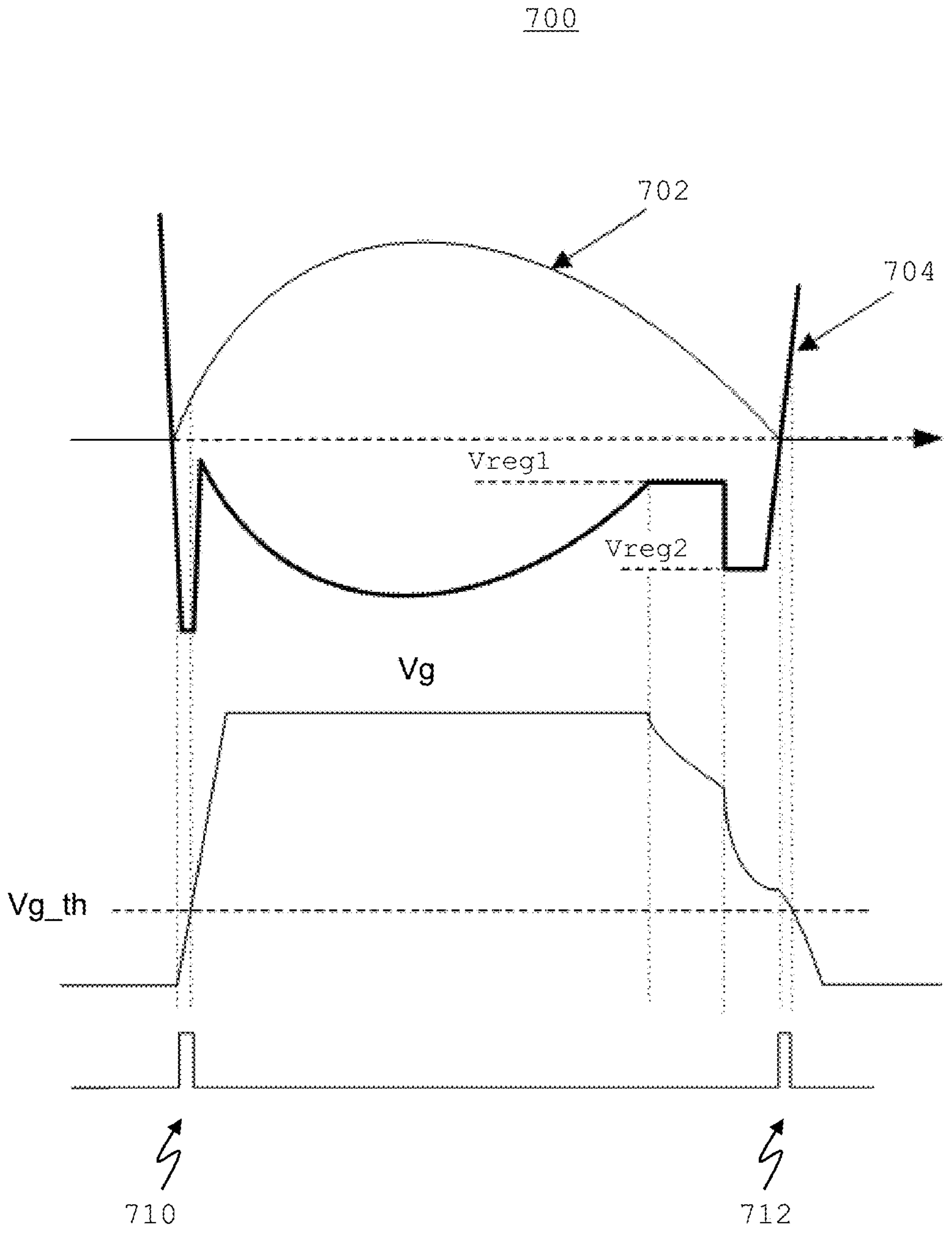
FIG. 7 shows a graph of currents, voltages and time delays of an electronic rectifier circuit for adaptive gate Vg regulation of a SR FET in a resonant mode converter, according to an example embodiment of the present disclosure.

FIG. 7 shows a third example graph 700 of currents, voltages and time delays for the circuit 400 in a resonant mode converter. Lines are shown for the SR current 702, the SR voltage 704 and Vg. In the Y-axis direction, voltage levels are indicated for a Vg_th, Vreg2 and Vreg1. The X-axis represents time. In the X-axis direction, the time on delay 710 and the time off delay 712 are indicated.

In resonant mode, also known as resonant switching or resonant operation, power converters may utilize resonant components (inductors and capacitors) to achieve efficient power conversion. As can be seen in the graph 700, Vds of the same SR FET may pass through the first and second stages of clamping under control of the first regulation voltage Vreg1 and the second regulation voltage Vreg2, respectively. The SR FET may be quickly turned off within a short time, i.e., Toff delay 712, when the turn on signal of the Pri FET arrives.

Comparing FIGS. 2-3 to FIGS. 5-7, it is clear that the circuit 400 advantageously enables a much shorter Toff delay 512, 612, 712 with adaptive Vg regulation. As a result, the switch device, such as the SR FET, will experience less stress, less cross conduction loss and have better reliability.

Figure 8:
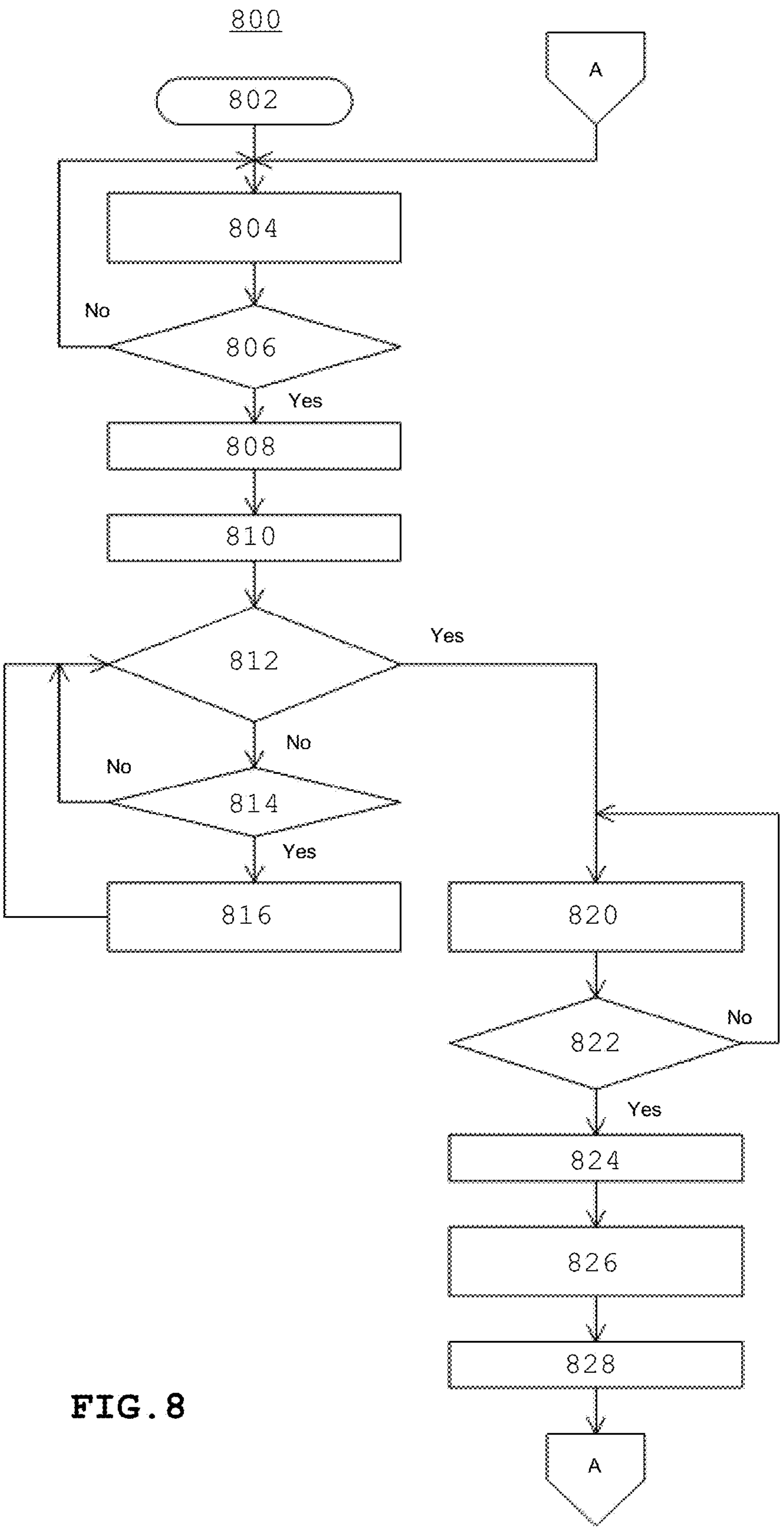
FIG. 8 shows a flow chart of a method of adaptive gate Vg regulation of a SR FET, according to an example embodiment of the present disclosure.

FIG. 8 shows an example control flow 800 of a SR FET of an example embodiment of the present disclosure. The control flow 800 starts at step 802. Reference "A" indicates a continuous loop, i.e., the flow ends and starts with "A".

In step 804 an SR control integrated circuit (IC) may detect Vds.

In step 806 it may be determined whether the detected Vds is smaller than the turn on level: Vds<Von_th? If this is not the case, the control flow 800 may return to step 804. Otherwise, if this is the case, the control flow 800 may continue at step 808.

In step 808 Vg may be set to 'high' to turn on the SR FET, and in step 810 a timer for measuring the on-time of the SR FET may be started.

In step 812 it may be determined whether the present on-time duration of the SR FET exceeds a percentage of the on-time duration of one or more previous switching cycles of the SR FET. Hereto, the on-time duration of the one or more previous switching cycles is, e.g., obtained from sample holder 420. For example, it may be determined: Ton_present_cycle>90% of Ton_previous_two_cycles? If this is not the case, the control flow 800 may continue at step 814. Otherwise, if this is the case, the control flow 800 may continue at step 820.

In step 814 it may be determined whether Vds exceeds the first regulation voltage Vreg1: Vds>Vreg1? If this is the case, the control flow 800 may continue at step 816. Otherwise, if this is not the case, the control flow 800 may return to step 812.

In step 816 Vg may be regulated to keep (i.e., clamp) Vds at the first regulation voltage Vreg1: Vds=Vreg1. The control flow 800 may then return to step 812.

In step 820 Vg may be regulated to keep (i.e., clamp) Vds at the second regulation voltage Vreg2: Vds=Vreg2.

In step 822 it may be determined whether Vds exceeds the turn off level: Vds>Voff_th? If this is not the case, then the control flow 800 may return to step 820. Otherwise, if this is the case, the control flow 800 may continue at step 824.

In step 824 Vg may be set to 'low' to turn off the SR FET, and in step 826 the total on-time duration of the present switching cycle (i.e., Ton) may be stored, e.g., in sample holder 420.

In step 828 the timer for measuring the on-time of the SR FET may be stopped, e.g., reset to zero, and the control flow 800 may run again for a next switching cycle, as depicted by the reference "A".

The invention claimed is:

1. An electronic rectifier circuit comprising:
- a synchronous rectifier field-effect transistor (SR FET);
- wherein the electronic rectifier circuit is configured for adaptive gate voltage (Vg) regulation of the SR FET;
- wherein the electronic rectifier circuit is configured to clamp a drain-source voltage (Vds), of the SR FET to a first regulation voltage (Vreg1), when a duration of an on-time of the SR FET is less than a threshold time in a current switching cycle;
- wherein the electronic rectifier circuit is configured to clamp the Vds of the SR FET to a second regulation voltage (Vreg2), when the duration of the SR FET on-time is more than the threshold time in the current switching cycle;
- wherein the threshold time is configured as a portion of on-time of the SR FET in one or more previous switching cycles, wherein the electronic rectifier circuit is configured to store the on-time of the SR FET in the current switching cycle for use as the previous on-time of the SR FET in a next switching cycle; and
- wherein Vreg2 is smaller than Vreg1.

2. The electronic rectifier circuit according to claim 1, comprising:
- a first Vg detection part configured to measure an amount of the on-time that the SR FET is on and store a first signal representative of the amount of on-time in a sample holder;
- a second Vg detection part configured to measure a further amount of the on-time that the SR FET is on to obtain a second signal;
- a comparator having as inputs, the first signal obtained from the sample holder and the second signal, and having as an output a selection signal;
- a multiplexer configured to output Vreg1 or Vreg2 depending on the selection signal.

3. The electronic rectifier circuit according to claim 2, wherein the first Vg detection part comprises a first capacitor, and wherein the second Vg detection part comprises a second capacitor, wherein the first capacitor and the second capacitor are dimensioned in a ratio defining the threshold time.

4. The electronic rectifier circuit according to claim 3, wherein the second capacitor is dimensioned at 90% of the value of the first capacitor.

5. A fast-charging power supply comprising a transformer, a primary side field-effect transistor (Pri FET), a synchronous rectifier field-effect transistor (SR FET), and an electronic rectifier circuit according to claim 4.

6. A fast-charging power supply comprising a transformer, a primary side field-effect transistor (Pri FET), a synchronous rectifier field-effect transistor (SR FET), and an electronic rectifier circuit according to claim 3.

7. A fast-charging power supply comprising a transformer, a primary side field-effect transistor (Pri FET), a synchronous rectifier field-effect transistor (SR FET), and an electronic rectifier circuit according to claim 2.

8. A fast-charging power supply comprising a transformer, a primary side field-effect transistor (Pri FET), a synchronous rectifier field-effect transistor (SR FET), and an electronic rectifier circuit according to claim 1.

9. A method of adaptive gate voltage (Vg), regulation of a synchronous rectifier field-effect transistor (SR FET), the method comprising:

turning on the SR FET by setting the Vg of the SR FET to high;

starting a timer for counting an on-time of the SR FET in a current switching cycle;

determining whether the on-time of the SR FET exceeds at least a portion of a previous on-time of the SR FET in one or more previous switching cycles;

clamping a drain-source voltage (Vds), to a first regulation voltage (Vreg1), if the on-time does not exceed the portion of the previous on-time;

clamping Vds to a second regulation voltage (Vreg2) when the on-time exceeds the portion of the previous on-time, and after the SR FET has been turned off, stopping the timer and storing the on-time of the SR FET obtained by the timer for use as the previous on-time in a next switching cycle.

10. The method according to claim 9, further comprising:

turning on the SR FET after detecting that the Vds of the SR FET is below a turn on threshold value (Von_th).

11. The method according to claim 10, further comprising:

after clamping the Vds to the Vreg2, determining if the Vds of the SR FET exceeds a turn off threshold value (Voff_th); and if the Vds of the SR FET exceeds the Voff_th, turning off the SR FET by setting the Vg to low.

12. The method according to claim 10, further comprising:

after the SR FET has been turned off, stopping the timer and storing the on-time of the SR FET obtained by the timer for use as the previous on-time in a next switching cycle.

13. The method according to claim 9, further comprising:

after clamping the Vds to the Vreg2, determining if the Vds of the SR FET exceeds a turn off threshold value (Voff_th); and if the Vds of the SR FET exceeds the Voff_th, turning off the SR FET by setting the Vg to low.

14. The method according to claim 13, further comprising:

after the SR FET has been turned off, stopping the timer and storing the on-time of the SR FET obtained by the timer for use as the previous on-time in a next switching cycle.

* * * * *